United States Patent [19]

Crandall et al.

[11] Patent Number: 4,584,936

[45] Date of Patent: Apr. 29, 1986

[54] BELT PRESS FRAME

[75] Inventors: Robert E. Crandall, Greendale; Roger B. Nickolaus, Franklin, both of Wis.

[73] Assignee: Rexnord Inc., Milwaukee, Wis.

[21] Appl. No.: 680,485

[22] Filed: Dec. 11, 1984

[51] Int. Cl.[4] ........................ B30B 5/06; B01D 33/04; D21F 1/00

[52] U.S. Cl. .................................... 100/118; 100/151; 162/273; 210/386; 210/401

[58] Field of Search ............... 100/118, 119, 120, 151, 100/152, 153, 154; 210/386, 232, 400, 401; 162/273, 274

[56] References Cited

U.S. PATENT DOCUMENTS

| | | | |
|---|---|---|---|
| 3,352,747 | 11/1967 | Lithgo et al. | 162/274 |
| 3,894,486 | 7/1975 | Sparowitz et al. . | |
| 3,951,809 | 4/1976 | Kollmar . | |
| 3,989,587 | 11/1976 | Grossman | 162/274 |
| 3,994,774 | 11/1976 | Halme et al. | 162/273 |
| 4,354,934 | 10/1982 | Kohonen . | |
| 4,450,630 | 5/1984 | Phelps | 162/273 X |

*Primary Examiner*—Peter Feldman
*Attorney, Agent, or Firm*—John M. Lorenzen; Lawrence J. Crain

[57] ABSTRACT

A belt press for dewatering slurries is described having a frame designed to minimize the time, effort and frame stress heretofore encountered in the replacement of endless belts, said press comprising a rigid frame comprised of essentially parallel horizontal and vertical members supporting a plurality of laterally oriented longitudinal rolls upon which a pair of endless flat foraminous belts pass in a serpentine path with dewatered material sandwiched therebetween. The frame is equipped with vertical legs having removable spacers on one side and corresponding elastomeric hinges mounted with pre-stressed bolts, and alignment pins on the other side. Jack means positionable between the sides of the frame, co-operate with the pre-stressed bolts to permit removal of the frame spacers and extraction of the endless belts through the resulting gaps in the vertical legs.

22 Claims, 7 Drawing Figures

BELT PRESS FRAME

BACKGROUND OF THE INVENTION

The present invention relates generally to belt presses used for increasing the solids concentration of slurries by reducing the liquid component, and more particularly to an improved frame for such a belt press which permits the removal and/or installation of endless belts.

Belt presses have been known for many years and have been used in many applications, such as the dewatering of sewage sludge, peat, industrial wastes, cement slurries, and coal slurries. The belt press of the present invention was designed to handle large volumes of slurry containing a wide variety of solids, including coarse, abrasive, relatively incompressible materials, such as coal fines or tailings which are washed from coal after it has been crushed.

Belt presses commonly consist of a pair of foraminous or water permeable belts which are held taught in two separate loops by a series of parallel support rolls mounted in a rigid frame. The loops are arranged so that the belts travel together but with a narrow gap between them in a serpentine path over special squeezing rolls. The material to be dewatered is forced into the narrow inter belt gap where the squeeze rolls exert pressure on the belt-slurry-belt sandwich to force water out through the porous belts.

In the past, such presses used belts which were threaded into place and spliced together. Spliced belts proved vulnerable to misalignment on the rolls and to frequent splitting along the spliced seam due to the extreme tension under which they operate.

The substitution of endless belts in belt presses has significantly improved the operation of the press and the life of the belts. Endless belts are not subject to the substantial stress along seams which was a major source of belt press down time when spliced belts were used. However, even endless belts must be periodically replaced due to their tendency to stretch or wear with time.

The use of endless belts requires a special frame for the press; in particular, one that can be separated or disassembled to permit belt replacement. Such frame designs have heretofore proven unsatisfactory because they have required either excessive time, care or equipment when making a belt change. Among their shortcomings is the problem that if the frame is not opened far enough, it is impossible to remove the belt. On the other hand, if the frame is opened too far, it may break or become deformed due to excessive stresses on the frame members.

Also, the separable frame sections are typically held in place by a number of large bolts which must be loosened and removed before the frame section can be separated. In some frame designs, the frame is provided with removable spacers which are also held in place with large bolts. The loosening and removal of bolts of this magnitude (typically $1\frac{1}{4}$ inches in diameter) is a tedious step which adds to the delay in the belt replacement process.

Prior art endless belt presses use one of two systems for breaking the press open and replacing the belts. In the first, known as the "outrigger method", telescoping members are extended laterally from the side of the press to provide stability. When the outriggers reach full extension, they are raised by jacks to effect the lifting of certain upper frame sections to separate the frame and permit replacement of an endless belt.

A major disadvantage of the outrigger method is the cost of constructing outriggers strong enough to support massive belt presses yet mobile enough to be easily extended by workmen or equipment at the job site. Furthermore, because of deflections in the telescoping members, it is difficult to predict or calculate the stresses within the frame itself, which may lead to over-designing to be on the safe side.

An additional disadvantage of the outrigger method is that when jacks are used to raise the belt press frame to allow extraction of the removable frame sections, there is a hazard of jacking the "belt change" side of the frame too high relative to the opposite side of the frame, which may cause the frame to become severely misaligned or even cracked.

The second system used to open belt presses for belt replacement is to substitute a crane for outriggers and jacks to lift the entire top of the frame or at least the "belt change" side of the frame. Although this method eliminates the costly and cumbersome outriggers, it is less precise and consequently more prone to "springing" or cracking the press frame.

The crane method also requires the time consuming removal and replacement of numerous large bolts which hold the frame sections together.

Accordingly, it is a principal object of the present invention to provide a frame for a belt press which permits the replacement of endless belts safely, in a minimum amount of time, with minimal cost, and with maximum accuracy.

Another object of the invention is to provide a belt press having a frame which has removable sections on one side and internally positionable jack means to facilitate rapid and easy removal and replacement of the endless belts through said one side.

Another object of the present invention is to provide a frame for a press frame in which at least one side of the frame is hinged so that belt replacement can be effected through the other side with a minimum risk of the frame cracking, deforming or springing.

Another object of the invention is to provide a belt press frame which is openable to permit replacement of the endless belts wherein all of the loading to effect the opening of the frame is confined within the frame structure itself.

A further object of this invention is to provide a frame for a belt press which can be opened to permit the lateral removal and replacement of an endless belt with a minimum number of large bolts or other fastening devices which have to be removed or loosened.

SUMMARY OF THE INVENTION

A frame is provided for a belt press, which typically includes a pair of independent, endless, flat foraminous belts traveling about laterally disposed support rolls and together over a series of squeeze rolls so that slurry material sandwiched between said belts is substantially squeezed of excess water. The frame is comprised of two side sections, each of which has a pair of vertically spaced longitudinal beams which support the ends of the belt support rolls and the squeeze rolls used in the dewatering process. The longitudinal beams on each side are connected to and spaced apart by at least one vertical leg. The side sections are held together by top and bottom laterally extending longitudinal beams.

In order to facilitate replacement of the endless belts, the frame is provided with a relatively small removable section in the vertical leg of the near side section, jack means positionable proximate the far side for spreading apart the longitudinal beams of the near side section to allow the removal of the removable frame section and for holding the frame in such opened position to permit removal and/or replacement of an endless belt through said near side, and a hinge mechanism on the far side section to allow for frame flexing during the frame opening process. The hinge mechanism is mounted in the vertical leg of the far side section in a location directly corresponding to the location of the removable portion of the near side leg. In the preferred embodiment the hinge mechanism includes a compressible elastomeric pad held in place with pre-stressed bolts and juxtaposed to an incompressible spacer plate held in position between the upper and lower leg sections by vertically extending alignment pins.

When belt replacement is required, the press is adjusted to produce maximum slack in the respective endless belts. Jacks are then positioned between the laterally extending connecting beams generally close to the hinged side. For convenience, guide rods are provided for supporting the jack means as they are slid onto prepositioned jacking pads to provide precise application of the lifting force. Any bolts securing the removable leg section are then removed.

As the jack means is extended to open up the referenced near side of the frame, the opposite side pivots on the pinned incompressible plate. The adjacent elastomeric pads are held in place by pre-stressed bolts which exert a small "squeezing" force which tends to assist the jack means in opening the frame without transmitting excess stress to the frame. The vertically extending locating pins extending through the incompressible plates maintain the frame in alignment while it pivots against the elastomeric pad.

Once the frame is hinged open, the removable sections are extracted and the endless belts are replaced through the gaps in the vertical leg.

Thus, the present invention provides a frame for a belt press which minimizes the risk of frame damage during the replacement of endless belts. In addition, the invention eliminates the need to use heavy equipment and greatly reduces the amount of labor and time needed to replace endless belts.

Further features and the attendant advantages of the invention will become apparent through the more detailed description of the preferred embodiments which follows with reference to the accompanying drawings, of which:

DESCRIPTION OF THE PREFERRED EMBODIMENT

Figure 1:
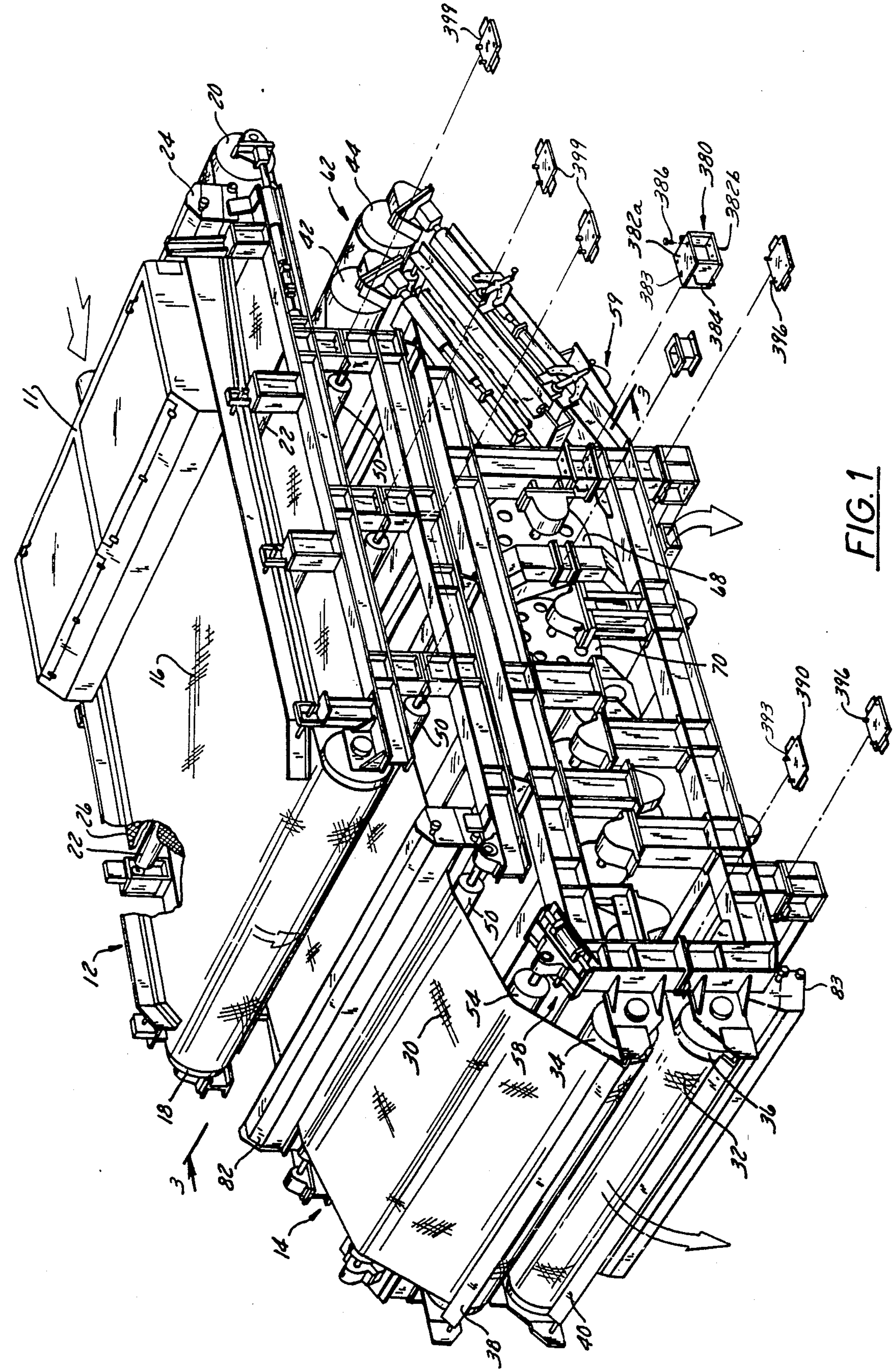
FIG. 1 is a perspective view of a belt press made in accordance with this invention.
Figure 2:
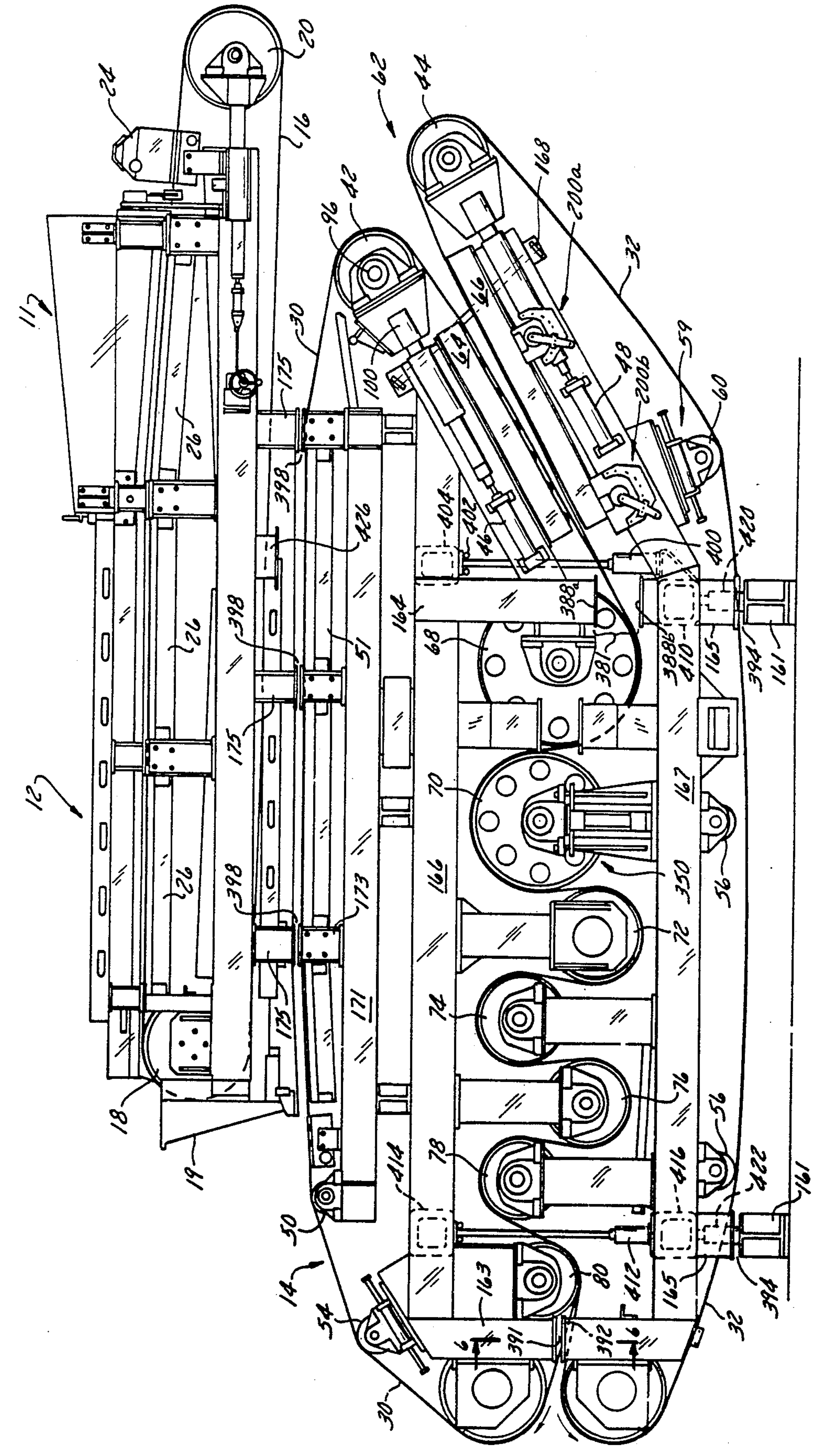
FIG. 2 is a side elevation of the belt press shown in FIG. 1; opened for belt replacement.
Figure 6:
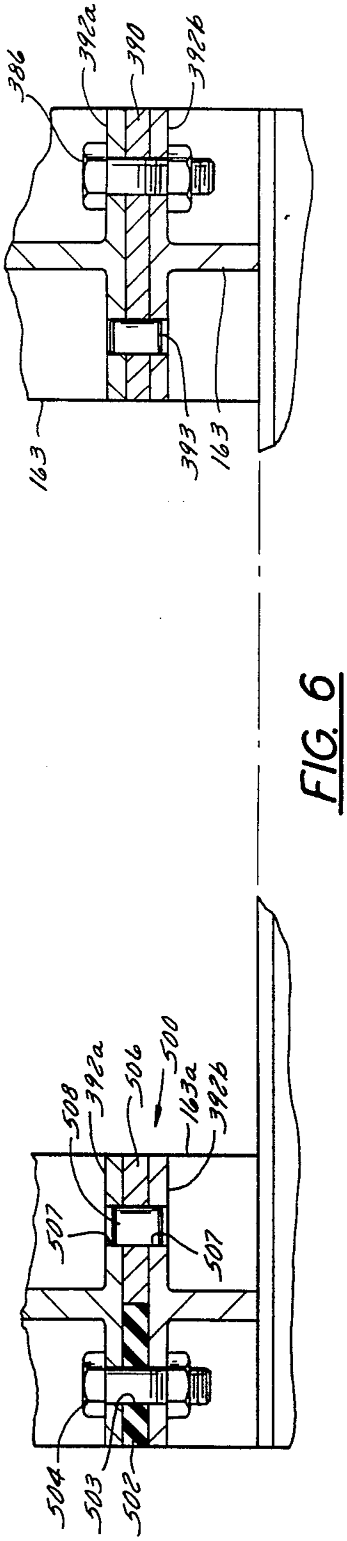
FIG. 6 is an enlarged sectional view through the hinge taken generally along line 6—6 of FIG. 2. of a hinge leg and a removable leg section such as those depicted in FIG. 2.

Referring now to the drawings wherein like reference numerals refer to identical or corresponding parts, and more particularly to FIGS. 1 and 2 thereof, a belt press according to this invention shown. For the sake of clarity and convenience, the side of the belt press seen in FIG. 2 will be referred to as the "near" side, and the opposite side will be referred to as the "far" side. The end of the belt press to the right in FIG. 2 will be referred to as the "front" end, and the end to the left will be referred to as the "rear" end. The direction of belt movement into the wedge section 62 at the front end of the press will be referred to as the "rear" end. The direction of belt movement into the wedge section 62 at the front end of the press will be referred to as the "axial" direction. For our purposes here the machine is generally symmetrical about a vertical plane containing the longitudinal axis of the machine, parallel to the plane of FIG. 2. Therefore, for the sake of succinctness, the description of one side will also be understood to apply to the other side as well, unless stated otherwise.

The belt press has an upper deck 12 and a lower deck 14. The upper deck 12 includes a single belt 16 which is driven by a drive roll 18 and is tensioned by a tensioning roll 20. The belt 16 is intermediately supported by a series of smaller rolls 22. The upper deck also includes a belt washer 24 and a distribution box 11 for receiving and spreading the slurry uniformly over the belt. The belt 16 is supported on the rolls 18, 20 and 22 above a grid 26 made of polymeric material so that, when unloaded, it runs above and out of contact with the grid 26 to reduce wear, and when loaded with slurry, runs in contact with the grid to facilitate removal of liquid from the underside of the belt.

The lower deck 14 includes an upper belt 30 and a lower belt 32 which are driven by drive rolls 34 and 36 respectively. The belts are for example a fine weave, endless polymeric mesh material. The drive motors (not shown) are hydraulic motors mounted directly on mounting brackets projecting rearwardly from the frame, and are coaxial with the bearings for the rolls. The motors drive planetary gear reduction units (not shown) mounted within the rolls.

Two tensioning rolls 42, 44 are provided at the head or front end of the press for tensioning the belts 30, 32 respectively. The tensioning rolls 42, 44 exert an adjustable uniform tension on the belts 30 and 32 by a tensioning system, which includes two hydraulic cylinders 46, 48. The upper belt 30 is supported along its top run by four small top rolls 50 which hold the belt off the grids when there is no slurry on the belt, for the same purpose as the rolls 22. A sensor (not shown) senses the belt position and controls a belt guiding roll 54 which maintains the belt in a straight tracking position.

Similarly, the lower run of the lower belt 32 is supported by small rolls 56 which hold the belt downward to clear a lower drain trough. Another sensor (not shown) senses the lateral position of the lower belt 32 and controls a steering control mechanism 59 for a steering roll 60, which maintains the belt 32 in proper alignment.

The tensioning rolls 42, 44 are at the upper forward end of a wedge section 62. The belts 30, 32 enter the wedge section at a given gap or separation and then are gradually brought closer together by a pair of opposed racks of rolls 64 and 66 which press the liquid from the slurry. The position of the racks of rolls 64, 66 can be adjusted vertically, axially and angularly in order to achieve the best dewatering.

Referring again to FIG. 2, after the belts 30, 32 have passed out of the exit end of the wedge section 62, the belts move together in a serpentine path over a set of large rolls, beginning with two perforated rolls 68, 70. The perforated rolls 68, 70 have holes along their cylindrical surfaces and on their ends. Water drains into the rolls through the holes in their cylindrical surfaces and then flows out through the holes in the end plates of the rolls. In the case of the roll 70, the water will flow out the holes in the cylindrical surface in the bottom of the roll and also out the ends. In the case of the roll 68, the belts do not extend all the way to the edge of the cylindrical surface, so water flows out the holes which are beyond the edge of the belt and also out the holes in the ends. The pressure on the belts increases as the belts pass over the next five rolls 72, 74, 76, 78, and 80, until the slurry cake is substantially dry.

The roll 70 is mounted on a vertically adjustable support which functions as a belt take-up and can also serve as a second belt tensioner which tensions both belts 30, 32.

The operation of the belt press is as follows: The slurry is pumped into the distribution box 11, which spreads it evenly over the belt 16. The belt 16 travels in a counterclockwise direction around the rolls 18 and 20 as shown in FIG. 2, and carries the slurry along the top run of the belt toward the drive roll 18, with water freely draining through the belt 16 along the way. The water is caught and conveyed away by a drain system. When the slurry reaches the tail or rear end of the belt 16, which is at the roll 18, it drops through a trough 19 onto the top run of the belt 30 just to the right of a belt washer 82. The top run of the belt 30 is moving to the right in FIG. 2, so the slurry reverses its direction, tumbles slightly to promote water separation, and continues to drain freely as the belt 30 moves back toward the head end of the press. When the slurry reaches the front or head end of the press at the tensioning roll 42, it is guided by a fence into a trough which funnels the slurry into the entry end of the wedge section 62 between the belts 30, 32. The slurry is carried through the wedge section 62 of the press where the water is gradually pressed out between the conveying belts 30, 32 by the upper and lower racks of rolls 64, 66 which apply gradually increasing pressure to the slurry. When the slurry emerges at the exit end of the wedge section 62 between the belts 30, 32, it is typically compressed into a moist cake. It is carried by the belts in a serpentine path over and around the rolls 68, 70, 72, 74, 76, 78, 80, where it is subjected to shear by virtue of the multiple changes of direction, and also to gradually increasing pressure. When the belts emerge from the tail end at the rolls 34, 36, the cake is dry and is scraped from the belts by means of the doctor blades 38, 40. The belts 30, 32 are then backwashed by the belt wash units 82, 83 and the process continues with the belt 30 returning underneath the trough 19 to pick up more of the slurry, and the belt 32 returning forward under the machine back to the entry end of the wedge section 62.

As shown in FIG. 1 and, in detail, in FIGS. 3–6, the frame of the belt press is provided with removable sections, hinge means and jack means to facilitate replacement of the endless belts 30 and 32. The system includes a number of removable sections in the frame and drain line, and a set of jacks to hold the frame open while the belt is removed or replaced through the gaps in the frame provided by the removable sections. The removable frame sections are shown exploded out of the frame in FIG. 1 and the frame is shown in FIG. 2 with the sections removed, the jacks in place, and the adjustments set for belt removal.

There is a removable frame section or spacer 380 in a gap 381 in the vertical frame beam 164. The spacer 380 is in the form of a short length of I-beam having top and bottom plates 382*a* and 382*b* welded to its top and bottom ends respectively, and having handles 384 welded to its sides for ease of handling. The spacer 380 is bolted in place by a pair of bolts 386 (only one of which is shown in FIG. 1), which pass through aligned holes in the plates 382 and corresponding plates 388*a* and 388*b* welded to the beam 164 at the top and bottom faces of the gap 381. The spacer 380 is also provided with a pair of aligning pins 383 which align with openings in the plates 388*a* and 388*b*.

A second spacer 390 fits into a second gap 391 in the rear vertical beam 163. The spacer 390 is a flat plate having holes drilled therethrough for receiving a pair of bolts which pass through aligned holes in plates 392 welded to the beam 163 at the top and bottom faces of the gap 391. In addition, each spacer 390 is fitted with two projecting pins 393 which engage correspondingly aligned holes in the upper and lower plates 392. A gap 394 similar to the gap 391 is provided between the legs 165 and the base beams 161, and a spacer 396 fits into each gap 394. Likewise, a similar gap 398 is provided between the three stump legs 173 on the overlying beam 171 and the vertically aligned legs 175 for the upper deck 12, and a spacer 399 is provided for each of the three gaps 398. Spacers 396 and 399 are of similar construction to spacer 390.

A system of jacks is provided to hold the gaps in the frame open while the belts 30 and 32 are removed and replaced. The jacks exert a vertical force on the frame members at about one-third of the frame width from the hinged side. They bear on transversely extending frame members to provide support for the overhung or cantilevered two-thirds width of the frame when the removable sections are removed.

Figure 3A:
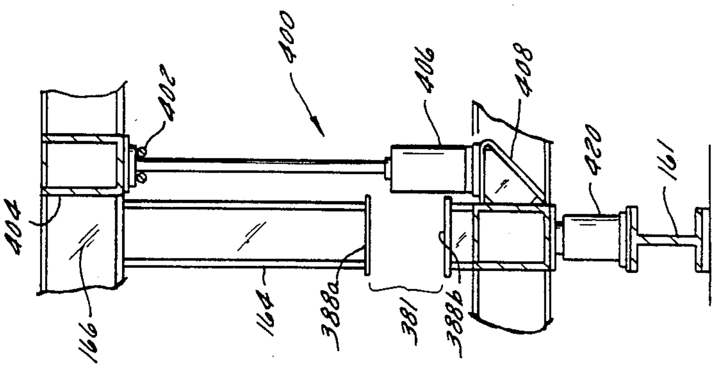
FIG. 3*a* is a side view of the frame section of FIG. 3.
Figure 3:
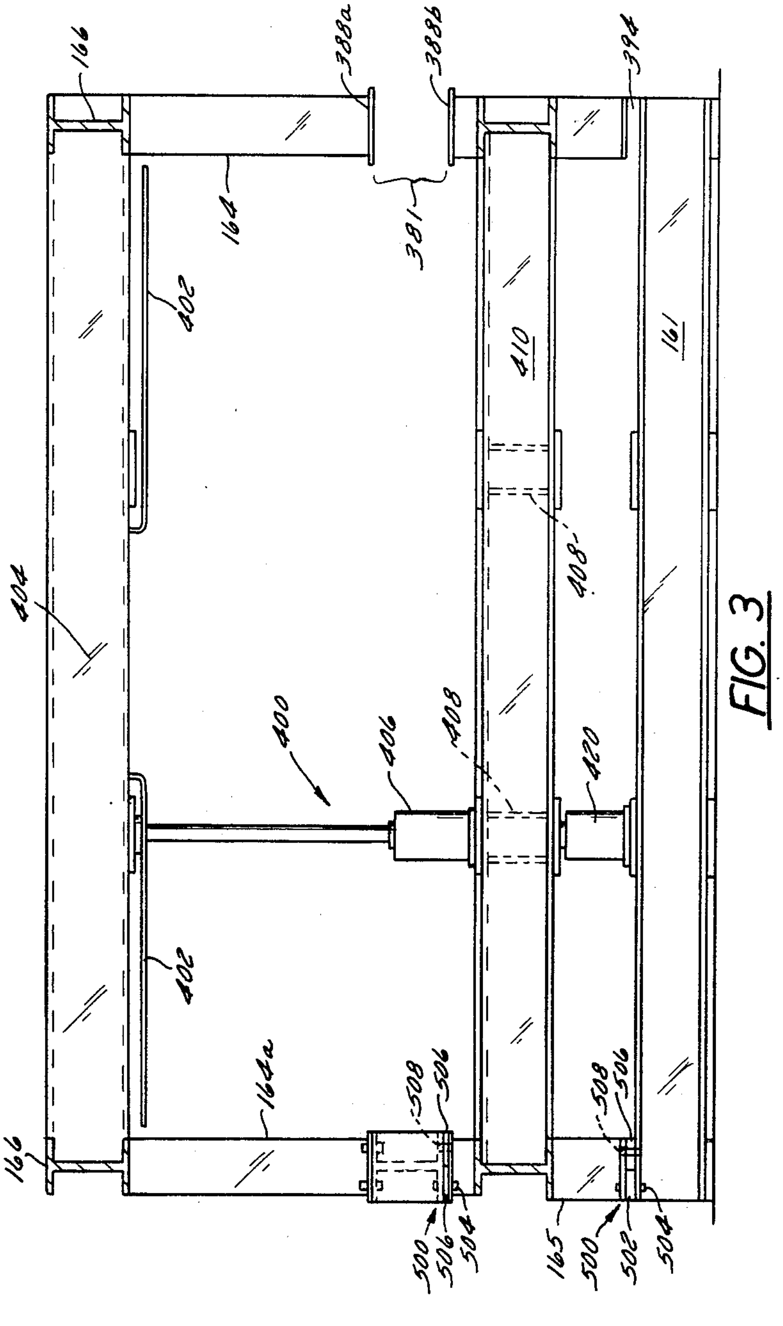
FIG. 3 is a partial sectional view taken along line 3′—3′ in FIG. 1 and showing two of the jacks in place.

As shown in FIGS. 2 and 3 a middle front jack 400 to hold open the gap 381 is loosely held by a pair of guide rods 402 fixed to a front top cross beam 404 welded between the near and far side main top beams 166. The jack 400 has a hydraulic cylinder base 406 that rests on a step 408 welded to a front center cross beam 410. The step 408 is aligned vertically below the cross beam 404 and serves to stiffen the cross beam 410 as well as support the jack 400. A middle rear jack 412, identical to the jack 400, is provided to hold open the gap 391. The jack 412 is disposed at the rear end between a rear top cross beam 414 and a rear center cross beam 416, both welded between the near and far side main top beams 166 and the near and far side bottom beams 167, respectively.

A lower front jack 420 is provided to hold open the front gap 394. The jack 420 is disposed between the front center cross beam 410 and the front cross base beam 161. A lower rear jack 422, identical to the lower front jack 420 is provided to hold open the rear gap 394. The lower rear jack 422 is disposed between the rear center cross beam 416 and the rear cross base beam 161. A set of similar jacks can be provided to hold open the gaps 398, although it is deemed suitable to also use an overhead crane for this purpose.

Figure 4:
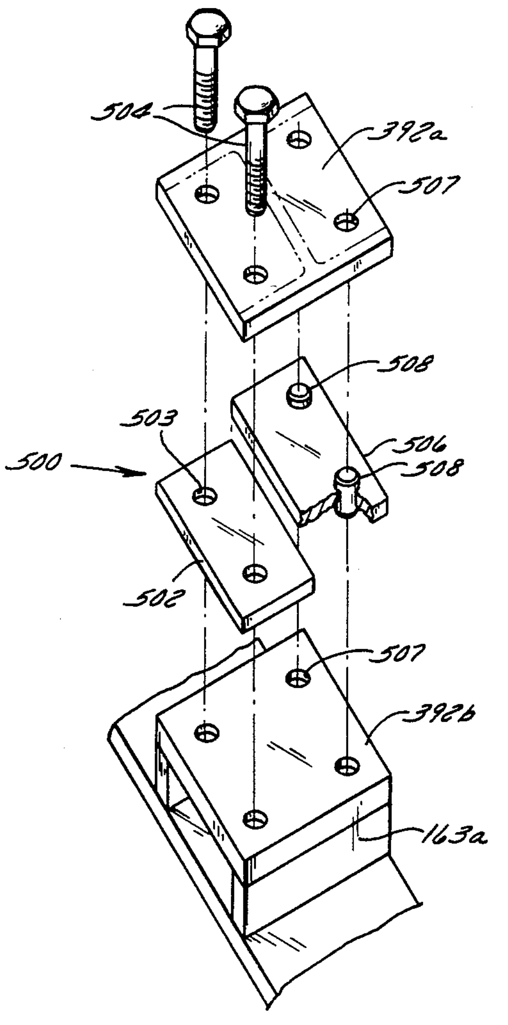
FIG. 4 is an exploded view of the hinge used in the belt press frame of the present invention.
Figure 5:
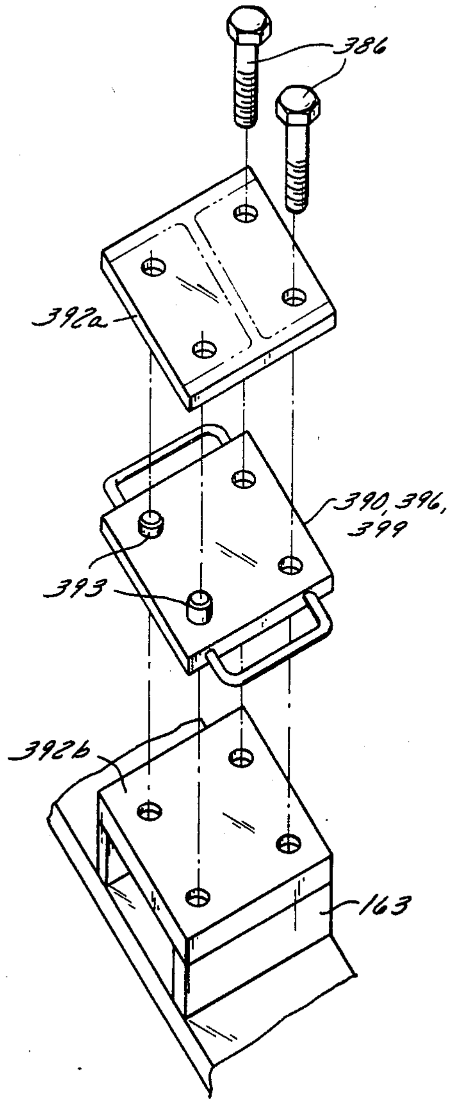
FIG. 5 is an exploded view of the removable spacer used on the belt installation side of the belt press frame of the present invention.

To facilitate the opening of the near side of the frame for belt removal and replacement without having to disconnect the opposite side to prevent unduly straining it, a set of hinges is provided. The hinges are located in the vertical beams or legs 161*a*, 163*a*, 164*a*, 165*a* and 175*a* on the far side of the frame at locations corresponding to the gaps 381, 391, 394 and 398. FIG. 4 shows one such hinge 500 which is comprised of a resilient pad of compressible material 502 with holes 503 aligned to accept bolts 504 passing through upper and lower frame member end plates 392*a* and 392*b*. Bolts 504 are pre-loaded at the factory which causes them to exert a compressing force on the outer end of the frame plates 392*a* and 392*b*. This compressing force assists the separation of the frame at gaps 381, 391, 394 and 398 when the jacks are elevated and the corresponding frame spacers 380, 390, 396 and 399 are removed. Directly adjacent to compression pad 502 is an incompressible metal plate 506 fitted with upper and lower vertically projecting pins 508 which also align with and extend through the corresponding holes 507 in the upper and lower frame member end plates 392*a* and 392*b*. The projecting pins are long enough to remain in engagement with the end plate holes 507 throughout the entire hinging action of the frame member 163*a*, 164*a* 161*a*, 165*a*, or 175*a* during the belt replacement process. In the preferred embodiment, the compressible pad 502 is constructed of a resilient elastomeric material and is positioned toward the outside of the press, with the metal plate 506 mounted adjacent the compressible pad 502 toward the inside of the press.

In operation, when it is desired to replace the belts 30 and 32, the machine is adjusted to slacken the belts 30 and 32. Specifically, the belt tensioning cylinders 46 and 48 are adjusted to their fully retracted position, and the secondary belt take-up mechanism 350 is adjusted to its retracted position. The tie rod 168 is removed on the belt installation side. The bolts 386 holding the removable frame spacers on the belt removal side are unscrewed and removed. Note that only two such bolts per spacer need to be removed. With the belt loose, it is possible to fold the belt at the far side of the machine over itself toward the near side to provide a space for the jacks to be slid into position.

The jacks 400, 412, 420 and 422, and also the jacks or crane for the top gaps 398 are put in place and raised to open the gaps 381, 391, 394 and 398. The spacers 380, 390, 396 and 399 are removed and the belts 30 and 32 are slid out of the near side of the machine.

When the frame has been opened to the extent necessary for belt replacement, the compression pads 502, which are not normally subject to compression due to the spacing of plates 392 by plates 506, absorb the deflection of the outer end of the plates 392. The edge of the incompressible plate 506 acts as a fulcrum for the pivoting of the frame leg. The hinging open of the frame acts to relieve the normal stress on the bolts 504. However, during the pivoting movement of the frame leg, the alignment of the various frame sections is maintained by the projecting pins 508 and bolts 504.

The new belt is installed through the gaps in the frame and the spacers 380, 390, 396 and 399 are reinserted. The jacks are lowered and slid back to the storage position adjacent the far side of the machine. The spacers are secured in position by replacing and tightening the bolts 386. The hinges 500 on the opposite side of the frame restrain racking of the frame and keep it generally aligned, making it much easier to replace the bolts 386. Alignment of the holes for the bolts 306 is further assisted by pins 383 and 393.

When the frame is in operating position, the rigid metal plates 504 again bear the weight of the upper frame sections at all hinge points and the bolts 504 are again prestressed. The belt is arranged smoothly over the rolls, and the belt take-up mechanism 350 is extended to the correct elevation. The tie rod 168 is reinstalled and the cylinders 46 and 48 of the belt tensioning system 45 are repressurized.

The belt press disclosed herein is a compact, efficient durable machine that effectively dewaters slurry. Its use of elastomeric hinges, pre-stressed bolts and alignment pins to minimize frame stress and to maintain the position of the frame during belt replacement has been observed to reduce the down-time necessary for that purpose by as much as 50%.

Obviously, numerous modifications and variations of the disclosed embodiment will occur to those skilled in the art in view of this disclosure and the prior art. Accordingly, it is expressly to be understood that these modifications and variations, and the equivalents thereof, may be practiced while remaining within the spirit and scope of the invention as set forth in the following claims.

What is claimed is:

1. A frame for facilitating installation and removal of endless belts for a belt press having a front end and a rear end, comprising:

two side frame sections, each having vertically spaced longitudinal beams held spaced apart by longitudinally spaced vertical end beams;

longitudinally spaced, laterally extending top beams fastened to the top one of said longitudinal beams on each side, and longitudinally spaced, laterally extending bottom beams fastened to the bottom one of said longitudinal beams on each side;

a removable section in each of said vertical end beams on at least one side of said frame;

hinge means in each of said vertical end beams on at least the other side of said frame; and a first jack slidably disposed between said top and bottom lateral beams at the front end of said frame, and a second jack slidably disposed between said top and bottom lateral beams at the rear end of said frame, such that said removable sections may be removed and said jacks operated to hold said frame open while said belts are removed and installed.

2. A frame for a belt press as recited in claim 1, wherein each of said hinge means comprises:

a plate of incompressible material disposed side-by-side with a pad of compressible material between upper and lower sections of said vertical end beam, said plate of incompressible material being toward the interior side of the press and said pad of compressible material being toward the exterior side of said press, whereby when said press is jacked open the upper section of said vertical end beam pivots on outer edge of said incompressible pad and squeezes said compressible pad.

3. A frame for a belt press as recited in claim 2, wherein said plate of incompressible material has at least one pin projecting perpendicular from both the upper and lower surface of said plate and extending through aligned holes in the upper and lower sections respectively of said vertical beam to retain said incompressible plate in place.

4. A frame for a belt press as recited in claim 2, wherein said pad of compressible material is retained in place by a bolt passing freely through a hole in said pad and extending through aligned holes in said upper and lower sections of said vertical end beam.

5. A frame for a belt press as recited in claim 4, wherein said bolt is tightened to a pre-loaded condition such that it partially relaxes but stays tight when the frame is opened and said upper and lower sections of said vertical beams squeeze against said compressible pad.

6. A frame, for a belt press which has a pair of endless flat belts traveling about laterally disposed support rolls and together in a serpentine path over and under a series of squeeze rolls to squeeze excess liquid out of slurry material sandwiched between said belts, comprising:

two side frame sections, each having a pair of longitudinal beams connected to and spaced vertically apart by at least one vertical leg, and each supporting an end of said support and squeeze rolls;

a laterally extending top beam rigidly attached to the top one of said longitudinal beams on each side, and a laterally extending bottom beam rigidly attached to the bottom one of said longitudinal beams on each side;

a removable spacer in the vertical leg in one of the side frame sections;

a hinge provided in the corresponding vertical leg in the other side frame section; and means for spreading said longitudinal beams vertically apart on said one side of the frame to permit removal of the spacer and for holding said vertical leg apart to enable the lateral removal or installation of an endless belt through the gap left by the removed spacer, whereby said hinge permits the spreading open of said one side frame section without additional stresses being imparted into the otherwise rigid frame.

7. A frame for a belt press as recited in claim 6, wherein said hinge is disposed between upper and lower sections of said corresponding vertical leg and comprises:

a rigid incompressible plate;

a pad of resiliently compressible material of substantially the same thickness as said plate; and means for retaining said plate and pad side-by-side between said upper and lower leg sections such that when the opposite side of the frame is opened said upper leg section pivots on said plate and squeezes against said pad.

8. A frame for a belt press as recited in claim 7, wherein said plate and pad together have generally the same area in a horizontal plane as the cross-section of said vertical leg.

9. A frame for a belt press as recited in claim 8, wherein said plate is positioned along the interior side of said vertical leg.

10. A frame for a belt press as recited in claim 9, wherein said plate includes aligning pins extending perpendicularly from both upper and lower surfaces of said plate and through aligned holes in the upper and lower leg section respectively.

11. A frame for a belt press as recited in claim 9, wherein said compressible pad is retained in place by bolts extending through aligned holes in said pad and the upper and lower leg sections.

12. A frame for a belt press as recited in claim 10, wherein said plate bears the load of the upper leg section and maintains the spacing between the upper and lower leg sections when the press frame is normally closed and wherein said bolts retaining the compressible pad are pretensioned against the upper and lower leg sections such that said bolts act to assist the means for spreading the opposite side of the frame and stay tight even when the frame is opened and the upper and lower leg sections compress the pad.

13. A frame for a belt press as recited in claim 12, wherein said removable spacer includes aligning pins extending perpendicularly from both upper and lower surfaces of said spacer and through aligned holes in the adjacent upper and loewr sections in the vertical leg in said one side frame section.

14. A frame for a belt press as recited in claim 13, wherein said removable spacer is retained in place when the press frame is closed by bolts extending through aligned holes in said spacer and the adjacent upper and lower leg sections.

15. A frame for a belt press as recited in claim 14, wherein said removable spacer is provided with at least one laterally extending handle to facilitate removal or replacement of said spacer.

16. A frame for a belt press as recited in claim 6, wherein said means for spreading said longitudinal beams on said one side of the frame is a jack positionable between said top and bottom beams extending between said side sections.

17. A frame for a belt press as recited in claim 16, wherein said jack is positioned approximately one-third of the distance from said hinged other side of the frame to said one openable side of the frame.

18. A frame for a belt press as recited in claim 12, wherein the means for spreading said longitudinal beams on said one openable side of the frame is a jack positionable between said top and bottom beams extending between said side frames but closer to said hinged other side of the frame, whereby said pretensioned bolts cooperate with and assist said jack in opening said frame.

19. A frame for a belt press as recited in claim 6, wherein each of said side frame sections comprises at least two vertical legs and said frame includes at least two laterally extending top beams and two laterally extending bottom beams, wherein all of the vertical legs in said one side frame section have a removable spacer and all of the vertical legs in said other side frame section include a hinge.

20. A frame for a belt press as recited in claim 19, wherein said means for vertically spreading said longitudinal beams on said one side of the frame includes at least two jacks each of which is positionable between one of said laterally extending top beams and one of said laterally extending bottom beams.

21. In a belt press which includes a frame, a plurality of upper and lower rolls and two endless belts which pass between said upper and lower rolls, an improved frame designed to allow the rapid and efficient removal and replacement of belts, comprising:

two side frame sections, each having two vertically spaced longitudinal beams held spaced apart by at least one substantially vertical leg;

at least one laterally extending top beam fastened to the top one of said top longitudinal beams on each side, and at least one laterally-extending bottom beam fastened to the bottom one of said longitudinal beams on each side;

a removable section in each of said vertical legs on at least one side of said frame;

at least one jack slidably disposed between said top and bottom lateral beams on at least one side of said frame;

at least one side of said frame having a hinge in said vertical leg to allow the opposite side of said frame to be held open by said jack while said removable sections are removed and said belts are removed and installed;

said hinge being positioned in a gap in said vertical leg which divides said leg into upper and lower portions, and comprising:

a compressible pad of resilient material; and a rigid plate having at least one projecting pin extending vertically above and below the plane of said rigid plate and engaging corresponding aligned openings in said upper and lower sections of said vertical leg;

said resilient compressible pad and said rigid plate positioned adjacent to each other in the gap in said vertical leg along a line parallel to the longitudinal axis of said frame such that when the opposite side of said frame is held open by said jack, said upper section of said hinged vertical leg pivots to compress said resilient compressible pad, and is held in alignment by said projecting pins of said rigid plate; and wherein said resilient compressible pad is secured in said gap of said vertical leg by at least one pre-stressed bolt extending through said upper and lower portions of said vertical leg.

22. A frame for a belt press described in claim 7, wherein said resilient compressible pad is positioned to face the outer margin of the side of said frame and said rigid plate is positioned to face the inner margin of the side of said frame.

* * * * *